United States Patent [19]
Jackson

[11] 3,772,004
[45] Nov. 13, 1973

[54] URANIUM, NIOBIUM AND CARBON ALLOY

[75] Inventor: Ross J. Jackson, Boulder, Colo.

[73] Assignee: The United States of America as represented by the United States Atomic Energy Commission, Washington, D.C.

[22] Filed: Aug. 11, 1972

[21] Appl. No.: 279,909

[52] U.S. Cl. .............................................. 75/122.7
[51] Int. Cl. ..................... C22c 27/00, C22c 31/00
[58] Field of Search ................................. 75/122.7

[56] References Cited
UNITED STATES PATENTS
3,708,433   1/1973   Leitnaker et al............. 252/301.1 R
3,418,245  12/1968   Hazelden et al.................. 75/122.7

OTHER PUBLICATIONS
Roof, "A Pseudo-Binary in the U-Cb-C System," Transactions of AIME, Vol. 212, AIME 1958, pp. 50-51 (Feb.) TN-A5.

Primary Examiner—Carl D. Quarforth
Assistant Examiner—B. Hunt
Attorney—John A. Horan

[57]   ABSTRACT

A heat-treatable alloy useable as a tool material wherein a uranium (U) base contains from about 2.0 to about 15.0 percent by weight niobium (Nb), and from about 0.05 to about 2.0 percent by weight carbon (C).

6 Claims, 6 Drawing Figures

ARC CAST SAMPLE-400X

VACUUM-INDUCTION CAST SAMPLE-800X

URANIUM, NIOBIUM AND CARBON ALLOY

BACKGROUND OF INVENTION

The use of tool materials throughout industry is extensive for cutting, machining, abrading, and other like applications. The type of material being processed or machined, and the application to which the tool and the product may be put, are factors which govern the type of tool material selected. Thus for most applications, the tool material selected to be used to do the machining or grinding must be compatible with the product being machined or ground. Preferred tool material properties may include a good hardenability range to allow for relatively easy fabrication of tools prior to hardening to required tool hardness, a high maximum hardness, excellent abrasion resistance, excellent wear resistance, a not extensive heat treatment and aging sequence, good cutting characteristics, ability to retain a smooth cutting edge and other similar properties.

Carbide cutting tools provide the above properties as well as high hot strengths, high melting points, good thermal shock resistance, high thermal conductivity, and good oxidation resistance — properties which are desirable in thermal environments encountered in high speed cutting and wear applications. Although there are various ways of making these tools, carbide cutting tools are generally a powder metallurgy product due to the refractory nature of the carbides, so that conventional carbide cutting tools generally comprise powder metallurgy tungsten, titanium, tantalum or niobium carbides distributed in a fixed strength powder metallurgy metal matrix.

SUMMARY OF INVENTION

It is an object of this invention to provide improved uranium base alloys which are useful as tool materials which have good cutting characteristics and good abrasion and wear resistance.

It is an object of this invention to provide improved uranium base alloys which are heat treatable to a wide range of hardnesses.

It is a further object of this invention to provide a uranium base alloy tool material embodying carbides wherein the size of the carbides can be varied, and wherein niobium (uranium) carbides are imbedded in corrosion resistant uranium-niobium alloy matrix.

It is a further object of this invention to provide uranium base alloy tool materials which are castable, or may otherwise be fabricated, to near final shape.

Various other objects and advantages will appear from the following description of the invention and the most novel features will be pointed out hereinafter in connection with the appended claims. It will be understood that various changes in the details and composition of the alloy components which are herein described in order to explain the nature of the invention may be made by those skilled in the art without departing from the principles and scope of this invention.

The invention comprises a heat treatable uranium alloy tool material containing from about 2.0 to about 15.0 percent by weight Nb, from about 0.05 to about 2.0 percent by weight C and remainder U, wherein the corrosion resistant uranium-niobium alloy matrix contains sharp, angular, hard, wear and abrasion resistant niobium (uranium) carbides. The carbides present in the U-Nb-C alloy of this invention are of the type $Nb_2C$ and NbC with uranium atoms substituting for niobium to a small extent. These carbides are herein referred to as niobium (uranium) carbides.

DETAILED DESCRIPTION

Figure 1:
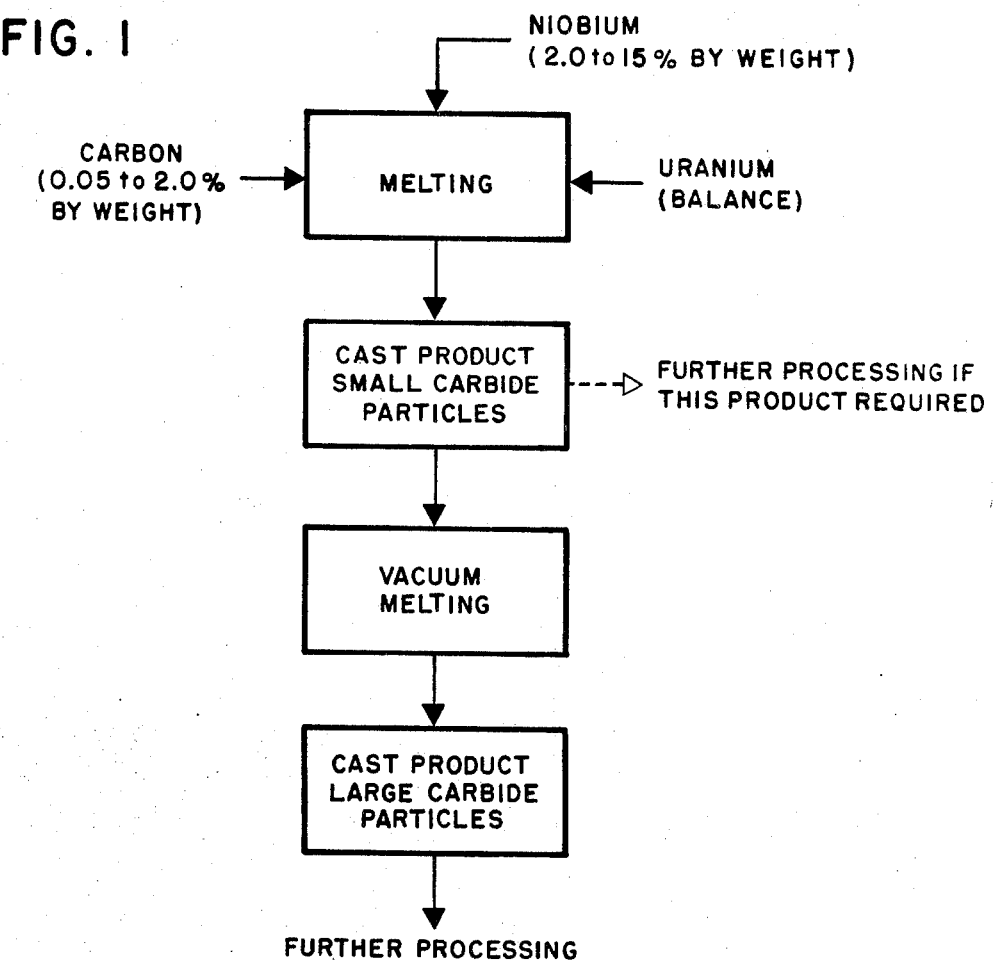
FIG. 1 outlines the flow process for obtaining cast U-Nb-C alloys having small and large carbides.

FIG. 1 illustrates a flow sequence for making the alloy of this invention into a desired cast product. As shown in FIG. 1, carbon at a weight percent of from about 0.05 to about 2.0, niobium at a weight percent of from about 2.0 to about 15.0, and uranium constituting the balance, may be melted through a suitable process and poured into a suitable mold. Electric arc melting of the constituent metals may be preferred not only because it provides small sized carbide inclusions but also because it may dissolve niobium (which has a melting temperature in excess of 2,400° C) in uranium which has a much lower melting temperature of about 1,132° C. For nonconsumable-electrode electric arc melting, the desired constituents may be weighed and melted in any suitable means, such as a water-cooled copper mold of the desired shape. For consumable-electrode electric arc melting, sandwich electrodes may be used in the melting process. This involves disposing in the furnace adjacent layers of the constituents in sandwich arrangement and passing electric current through the constituents so as to arc melt the constituents. A procedure which has been successfully used involves fabricating, by extrusion or sheet forming, a hollow uranium cylinder or box of suitable size for the equipment being used, placing or sandwiching appropriate proportions of filler strips of niobium and uranium, and carbon rods, in layers into the hollow center to yield desired composition after melting and casting, applying the electrical current so as to arc-melt the electrode and other constituents into a slightly tapered, cylindrical, water cooled copper mold using a direct current normal polarity arc with unidirectional, alternating current magnetic stirring. Using this process, power requirements for producing a 4 inch diameter ingot, 42 inches long are about 26 volts and about 2,600 to 2,800 amperes.

The electric arc U-Nb-C alloys thus melted may be used as cast to take advantage of the small size (generally from about 1 to about 20 microns diameter) of the niobium (uranium) carbides. The flow sequence of FIG. 1 shows this use by means of a dotted line extending from the cast product step. Size of carbides is dependent on cooling rates. Faster cooling rates promote formation of small carbides; thus, cooling rates may be used for controlling carbide size. When large size inclusions are preferred, an accepted procedure may be to follow the continuous line sequence shown in FIG. 1. Large size inclusions (varying from about 10 to 200 microns average diameter) may be obtained by varying the cooling rate after a further suitable melting process which may preferably use vacuum induction furnace melting.

A process which has been successfully used to yield the above described large carbide particles in the uranium-noibium matrix involves the use of a coated graphite crucible with bottom pour hole and coated graphite stopper. The coating on the crucible and stopper may typically be of about 10 mil thickness of stabilized zirconia or magnesium zirconate applied by wet spraying or the like. The electric arc cast product described above may be positioned as a charge in the stoppered crucible for a subsequent melting and casting process, such as vacuum or inert gas induction furnace melting. The charge is heated to from about 1,450° C to about 1,475° C and may be under a vacuum of less than $1 \times 10^{-3}$ mm of mercury until the charge is completely molten (from about 15 to about 30 minutes generally, depending upon composition, method of placing charge in crucible, power applied, etc.) at which time the charge may be poured into a similarly zirconia or magnesium zirconate-coated graphite mold of suitable tool or ingot shape. For large castings (e.g., 10 to 500 kg), preheating of the mold to about 1,000° C may be desirable to prevent casting defects. In small castings preheating of the mold may not be necessary unless a slower cooling rate is desired (i.e., when very large carbides are desired). Although vacuum melting and casting has been discussed, the same results may be obtained while using an inert gas atmosphere during electrical induction furnace melting, casting, pouring and cooling, i.e., in lieu of a vacuum. Any suitable receptacle may be used as a mold.

After casting by suitable means such as described above, the U-Nb-C alloy thus prepared may be heat treated for 4 hours at from about 1,125° C to about 1,150° C in a suitable nonreactive atmosphere, such as argon gas or in a vacuum of about $10^{-3}$ mm of mercury, to homogenize the niobium-uranium matrix phase. The length of time required for homogenization varies with composition, material thickness, material volume, temperature selected, etc. The alloy product may then be quenched through suitable quenching processes. Water quenching a 140 kilogram (kg) ingot within 60 seconds after removal from the homogenization furnace has been successfully used to leave the material in the soft condition for subsequent shaping or forming operations or hardening heat treatments.

Tool shapes may be cast directly from the melting operations described hereinabove. Consequently separate melting and casting from ingots is not required.

Tools may also be forged from this alloy. Hot forming may be required in order to prevent fracturing of the carbide inclusions and to prevent initiation of cracks within the forged product. The forming blank may be preheated to from about 750° C to about 850° C and the alloy should be maintained at a temperature greater than about 600° C during forming. Forming dies used may be of a suitable tool steel such as one having a nominal composition of 0.35 carbon, 1.50 molybdenum, 5.00 chromium, 0.40 vanadium and balance iron. Graphitized molybdenum disulfide may be used as a lubricant. Immediately after forming, the tool may be reheated to a temperature between about 825° C and about 850° C for about 30 minutes and then quenched in a suitable low temperature bath quench within about 5 seconds. Heating at the temperature range recited for the required length of time effects a recovery, recrystallization and residual stress relief of the matrix, while the suitable low temperature bath quench places the matrix alloy in the soft condition for subsequent hardening or other operations. Suitable low temperature baths that may be used include conventional water quench baths (between about 0° C and 50° C), suitable salt baths (between about 450° C and about 650° C), liquid tin baths (between about 250° C and about 450° C), or suitable silicone oil baths (between about 50° C and 250° C).

Tools which have been cast or forged using material of this invention, and which have been water quenched to the soft condition may have, if required, sharp edges produced by grinding on or with diamond containing wheels. Further, wear resistant surfaces may be readily produced on alloys of this invention by suitable carburization processes such as by heating from about 700° C to about 1,000° C in a carbon environment for a suitable length of time such as between about 1 and 24 hours.

Figure 2:
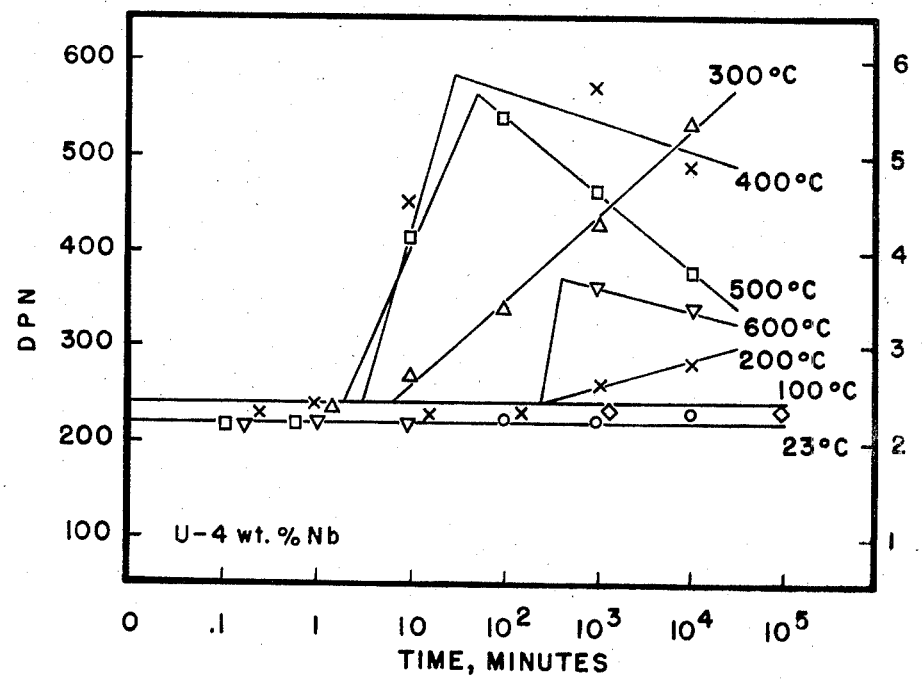
FIGS. 2, 3 and 4 are graphs displaying matrix hardness versus aging times for the uranium-niobium matrix with varying niobium weight percent concentrations.
Figure 3:
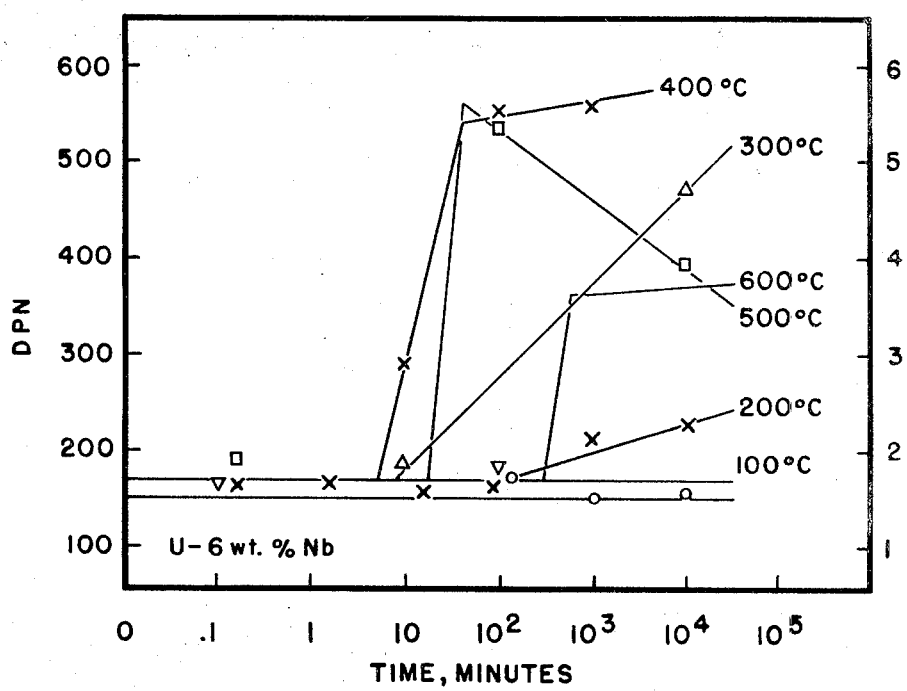
Figure 4:
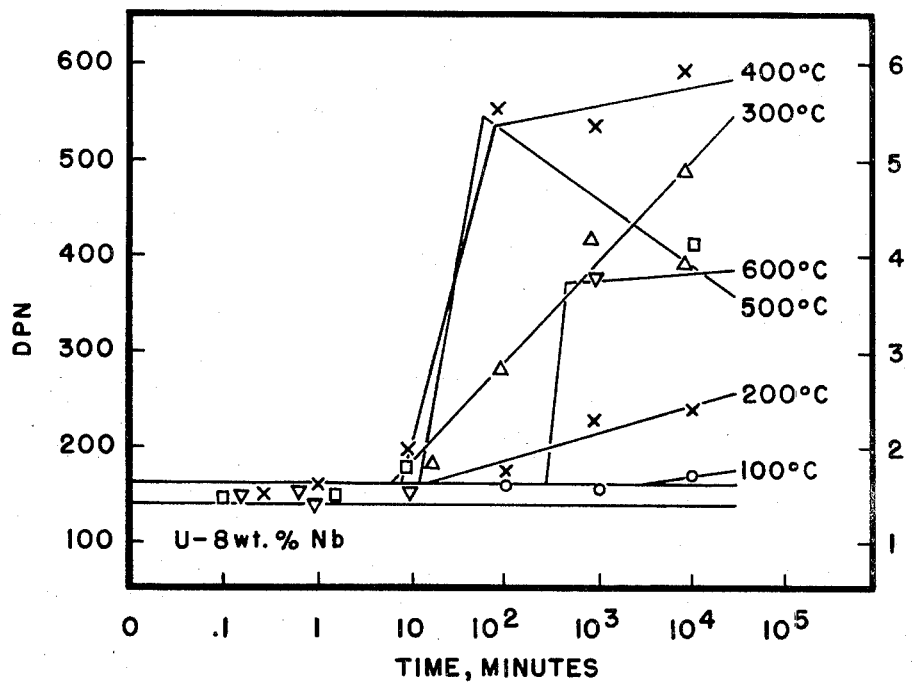

After the tool has been cast or forged, the matrix material may be aged (either by quenching directly into a suitable low temperature bath as listed above and retaining for a prescribed time, or by quenching to a lower temperature and then reheating to aging temperature) in the temperature range of about 100° C to about 600° C for a suitable number of hours (such as about 1 to 4 hours) depending upon strength desired, part geometry, and part size. FIGS. 2 through 4 show typical matrix hardness values at increasing niobium weight percentages of 4, 6, and 8 weight percent, respectively. The hardness values shown were obtained on disk shaped samples, 50 mils thick by ⅜ inch diameter, which were machined from cross rolled sheets. The material used was low carbon content, approximately 90 parts per million, and therefore represents actual matrix hardness. Hardnesses were obtained by heating to about 850° C and maintaining at temperature for about 30 minutes followed by a water quench, (the cooling rate with size of samples used is about 1,000° C per second). This treatment puts the matrix in the soft condition and readies it for subsequent aging treatments. Aging consists of heating to the temperature desired followed by isothermal holding for the indicated times and temperatures. For quenching and isothermal holding, the samples were lightly wrapped in 2 mil tantalum sheet and encapsulated in amorphous quartz tubing under vacuum. Hardness results in diamond pyramid numerals (DPN) were obtained using diamond pyramid hardness tests and standard equipment and processes including polishing of samples. These numerals have ranged in value from about 130 to about 600 diamond pyramid numerals.

The FIGS. 2, 3, and 4 have certain property similarities. For example, aging at 100° C may not have any significant effect at times up to about $10^4$ minutes. Aging at 200° C yields a gradually increasing slope such that after about $10^4$ minutes at temperature, increase in hardness is minimal, i.e., between about 50 and 100 DPN difference. The 300° C isotherm is the most linear over the time vs hardness graph. This isotherm may require extensive furnace time, however, and the 400° C isotherm may be preferred for hardening the alloy since this provides maximum hardness with a minimum amount of time. Although the 500° C isotherm also results in maximum hardness within a short time, the sharp decrease in hardness thereafter may make such a fast heating rate undesirable. The 600° C isotherm also results in a hardness increase but requires more time and does not reach maximum hardness possible with other isotherms. Control of the matrix hardness through such aging times as shown above enables proper cutting edge exposure for best use of the alloy herein described.

The alloy matrix may be dissolved or leached using a suitable acid to yield, and enable the collection of, undissolved carbide particles. These carbides may then be used as a grinding powder or can be distributed in a different matrix material. A typical leaching procedure may involve the addition of concentrated hydrochloric acid to the matrix followed by, after reaction has subsided, the slow addition of 30 percent hydrogen peroxide until the solution has cleared, and finally separation of the carbide through a suitable process such as filtration, decantation, etc.

Figure 5:
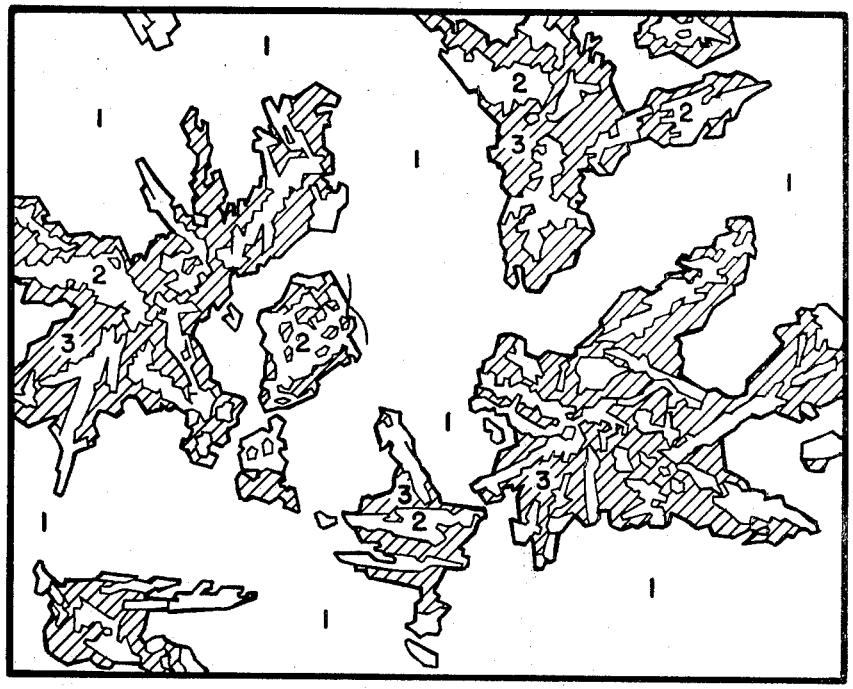
FIG. 5 is a representative drawing of the arc cast structure magnified 400 times.
Figure 6:
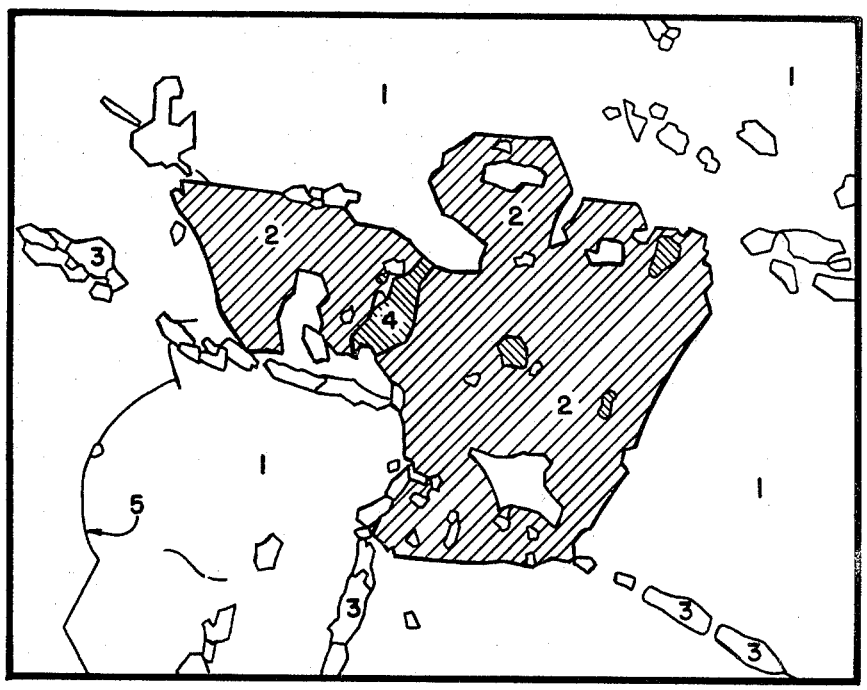
FIG. 6 is a representative drawing of the vacuum induction cast structure magnified 800 times.

FIGS. 5 and 6 depict representative drawings of a microstructure of the alloy material of this invention. In FIG. 5, the drawing shows niobium (uranium) carbides in a homogenized arc-cast uranium-6 weight percnet niobium-0.1 weight percent carbon alloy. The drawing is from a photomicrograph of a sample in the as-polished condition and magnified 400 times, i.e., at 400X. The numeral 1 indicates the niobium-uranium matrix. The numeral 2 indicates the niobium carbides in the form of NbC and $Nb_2C$. The area 3 which is cross hatched, is representative of niobium deficient matrix material, i.e, the niobium has been extracted from areas adjacent the carbides to provide the niobium carbides.

FIG. 6 shows the carbides in a homogenized vacuum-induction cast uranium-6 weight percent niobium-0.1 weight percent carbon alloy. The drawing is from a photomicrograph of a sample in the polished and lightly etched condition and magnified 800 times, i.e., at 800X.

The numeral 1 again indicates the uranium-niobium alloy matrix. The bottom left to top right cross hatching represented by numeral 2, is niobium carbide-NbC. The sharp, elongated structure or particles, represented by numeral 3, is another form of niobium carbide, $Nb_2C$. The top left to bottom right cross hatch, area 4, represents a void in the structure existent in the original photomicrograph and reproduced herein for the sake of accuracy. The line 5 in FIG. 6 represents a grain boundary. Uranium carbides are minimal and were not identified in the figures. Generally the uranium is in the matrix.

In summary, the invention herein described comprises a novel uranium base tool material with excellent hardness properties and excellent wear and abrasion resistance, and the process that produces sharp, angular, hard, wear resistant niobium (uranium) carbides of controllable size imbedded in a corrosion resistant and variable strength uranium-niobium alloy matrix. The composition of the material herein described includes a uranium alloy embodying from about 2.0 percent to about 15.0 percent by weight of niobium and from about 0.05 to about 2.0 by weight of carbon. Generally, the components should be of high purity, but minor amounts of those impurities normally associated with each component can be tolerated. It is to be understood that use of the term "uranium" and "niobium" is intended to include such minor impurities as may be normally associated with commercial grades of these components.

What is claimed is:

1. An alloy comprising from about 2.0 to about 15.0 percent by weight of niobium, from about 0.05 to about 2.0 percent by weight carbon, the remainder being uranium, said uranium and said niobium forming a corrosion resistant uranium-niobium matrix having carbides embedded throughout said matrix.

2. The alloy of claim 1 wherein said matrix of uranium-niobium embodies dispersed therethrough multitudinous angular and wear resistant inclusions of niobium carbide wherein said inclusion size ranges are taken from the group of about 1 micron to about 20 microns and from about 10 microns to about 200 microns and wherein said matrix has a hardness, determined by the diamond pyramid hardness test, of from about 130 to about 600 diamond pyramid numerals.

3. The method of producing an alloy having a matrix of uranium and niobium embodying dispersed therethrough multitudinous discrete, angular, sharp edged and wear-resistant inclusions of niobium carbide which comprises subjecting the constituents uranium, niobium, carbon to arc melting in a furnace, casting said melt in a receptacle providing a cast product having an alloy composition of from about 0.05 to about 2.0 carbon weight percent, about 2.0 to about 15.0 niobium weight percent, and the remainder uranium, with the matrix having niobium carbide inclusions ranging from about 1 micron to about 20 microns, heat treating the cast product for between about 3 and about 4 hours at between about 1,125° C and 1,150° C, quenching the product to a temperature between about 0° C and about 30° C, aging for between about 1 and about 4 hours at between about 100° C and 600° C in an inert environment to achieve between about 130 and about 600 matrix diamond pyramid hardness value.

4. The method of claim 3 further including, before said heat treating, induction melting the cast product by heating to from about 1,450° C to about 1,475° C, holding said temperature for from about 15 minutes to about 30 minutes, casting into a receptacle, and providing an induction melted and cast product having said alloy composition with a matrix having niobium carbide inclusions ranging from about 10 microns to about 200 microns, and thereafter performing said heat treating on said induction melted and cast product.

5. The method of claim 3 further including producing wear resistant surfaces on said cast product by heating said cast product at from about 700° C to about 1,000° C for from about 1 to about 24 hours in a carburizing environment.

6. The method of claim 4 together with providing, during said induction melting, a furnace atmosphere taken from the group consisting of a vacuum at a pressure of less than $1 \times 10^{-3}$ mm mercury and an inert gas.

* * * * *